United States Patent
Busby et al.

[19]

[11] Patent Number: 6,095,733
[45] Date of Patent: Aug. 1, 2000

[54] THREADED FASTENER WITH DETERMINABLE CLAMP LOAD

[75] Inventors: Donald C. Busby, Crawford; Walter J. Smith, Waco, both of Tex.

[73] Assignee: Huck International, Inc., Tucson, Ariz.

[21] Appl. No.: 09/107,154

[22] Filed: Jun. 29, 1998

[51] Int. Cl.[7] .............................. F16B 31/02; F16B 37/08
[52] U.S. Cl. .......................... 411/10; 411/313; 411/428; 411/432; 411/533
[58] Field of Search ................................. 411/3, 5, 9, 10, 411/14, 270, 432, 428, 533, 313

[56] References Cited

U.S. PATENT DOCUMENTS

| | | |
|---|---|---|
| 445,469 | 1/1891 | Harvey . |
| 632,422 | 9/1899 | McLaughlin . |
| 661,655 | 11/1900 | Bryce . |
| 788,572 | 2/1905 | Gibbs . |
| 1,115,924 | 11/1914 | Goble . |
| 1,183,556 | 5/1916 | Green . |
| 1,198,452 | 9/1916 | Keadle . |
| 1,303,784 | 5/1919 | Emery . |
| 1,464,591 | 8/1923 | Weichold, Jr. . |
| 1,639,511 | 8/1927 | Lafever . |
| 1,720,799 | 7/1929 | McLaughlin . |
| 1,838,605 | 12/1931 | Youlten . |
| 1,928,769 | 10/1933 | Teetor . |
| 2,001,290 | 5/1935 | Thomson . |
| 2,380,994 | 8/1945 | Pummill . |
| 2,520,259 | 8/1950 | Pummill . |
| 3,252,495 | 5/1966 | Waltermire . |
| 3,295,580 | 1/1967 | Waltermire . |
| 3,337,946 | 8/1967 | Anderson et al. . |
| 3,399,589 | 9/1968 | Breed . |
| 3,431,812 | 3/1969 | Dahl ............................................ 411/9 |
| 3,481,243 | 12/1969 | Gatz . |
| 3,481,380 | 12/1969 | Breed . |
| 3,482,864 | 12/1969 | Bynum ........................................ 411/5 |
| 3,504,722 | 4/1970 | Breed . |
| 3,512,447 | 5/1970 | Vaughn ........................................ 411/5 |
| 3,526,914 | 9/1970 | Breed . |
| 3,572,414 | 3/1971 | Onufer . |
| 3,630,253 | 12/1971 | Sherman . |
| 3,693,685 | 9/1972 | Onufer . |
| 3,805,863 | 4/1974 | Starr . |
| 3,887,990 | 6/1975 | Wilson . |
| 3,899,766 | 8/1975 | Mermelstein . |
| 4,389,766 | 6/1983 | Capuano . |
| 4,518,295 | 5/1985 | Matuschek . |
| 4,790,703 | 12/1988 | Wing ...................................... 411/533 X |
| 4,887,948 | 12/1989 | Calmettes ............................... 411/10 X |

(List continued on next page.)

FOREIGN PATENT DOCUMENTS

| | | | |
|---|---|---|---|
| 1384511 | 2/1975 | United Kingdom ...................... 411/10 |

OTHER PUBLICATIONS

U.S. Patent Application No. 08/838,235, filed Apr. 16, 1997 for: Free Running Prevailing Torque Nut and all art of record in that application including the prior art listed on the I.D.S. Citation and Notice of References Cited (copies attached).

The Bethlehem Load Indicator Washer, pp. 28–31, Apr., 1972.

Standard Specification for Compressible–Washer–Type Direct Tension Indicators for Use with Structural Fasteners. ASTM: F959–90.

*Primary Examiner*—Neill Wilson
*Attorney, Agent, or Firm*—Harness, Dickey & Pierce P.L.C.

[57] ABSTRACT

A threaded fastener for securing workpieces with a determinable desired clamp load and including a nut assembly and a bolt with the nut assembly including a nut member with a lock base having a load ring portion and a boss portion with the boss portion adapted to be located in a retention counterbore in the nut member and being of a length to provide a gap between the load ring portion and nut and at a predetermined load to collapse and close the gap and be deformed radially into compressive engagement with the threads of the bolt to provide prevailing torque type lock structure resisting loosening of the nut assembly from the bolt with the predetermined collapse load providing the desired clamp load and with the gap closure visibly indicating attainment of the desired clamp load.

41 Claims, 4 Drawing Sheets

U.S. PATENT DOCUMENTS

| | | |
|---|---|---|
| 4,979,857 | 12/1990 | Wing . |
| 5,090,852 | 2/1992 | Dixon . |
| 5,219,255 | 6/1993 | Hussain et al. . |
| 5,366,331 | 11/1994 | Erbes . |
| 5,393,183 | 2/1995 | Hinton . |
| 5,486,079 | 1/1996 | Martin et al. . |
| 5,915,902 | 6/1999 | Patterson et al. . |

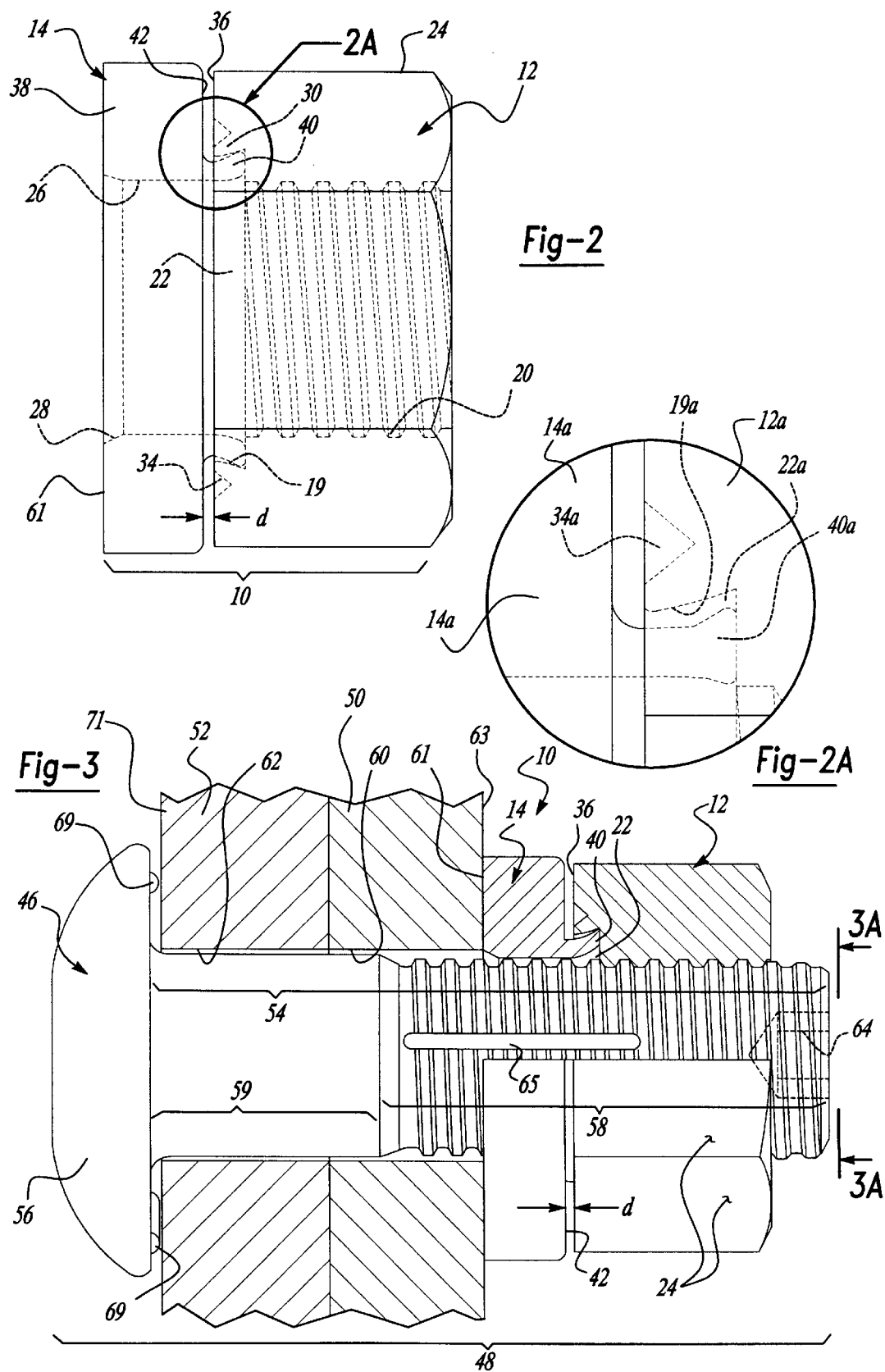

THREADED FASTENER WITH DETERMINABLE CLAMP LOAD

SUMMARY BACKGROUND OF THE INVENTION

The present invention relates to a fastener system including a threaded fastener having a determinable and visibly indicatable clamp load feature and in addition having an anti-loosening or prevailing torque type lock feature.

Threaded fastener assemblies are used in many applications for aerospace and industrial constructions. Such assemblies include threaded bolts or studs and nut members having a matching thread form.

In securing workpieces together with threaded fasteners, such as a nut and a bolt, it is desirable that the magnitude of final clamp load achieved be at a desirable magnitude which is readily verifiable. If the clamp load is too low, loosening of the joint could occur. If the clamp load is excessive this could result in damage to the workpiece and/or damage or excessive stress on the fastener. Frequently the magnitude of clamp load is determined substantially solely by measuring the torque applied between the nut and bolt. When the torque reaches a particular magnitude it is expected that a certain magnitude of clamp load has been attained. Unfortunately this is not uniformly predictable since the applied torque is resisted by the inherent friction between the engaged threads and other surfaces that are being rotated relative to each other. The magnitude of the friction can vary considerably depending upon numerous factors including the fit between the engaging threads, the lubricity, if any, between the engaged surfaces, temperature, installation environment and the like.

The threaded fastener construction of the present invention provides a unique way for predictably providing a selected, desired magnitude of final clamp load of the workpieces being joined. At the same time the fastener construction provides a means for readily verifying attainment of the desired magnitude of final clamp load. In addition the fastener has a unique construction for providing an anti-loosening or prevailing torque type lock feature between the nut and bolt without affecting the attainment and predictability of the desired magnitude of final clamp load.

In applications subject to vibration or repeated load fluctuations threaded fastener assemblies have been known to lose their retention torque and to loosen. To inhibit such action, threaded fastener assemblies have been modified to provide a prevailing torque feature to resist loosening and loss of clamp of the workpieces or articles which are joined. Frequently, a prevailing torque feature has been attained by providing one of the mating thread forms with a distorted portion such that, upon engagement between the distorted thread portion and the undistorted thread form, the nut member and the stud or bolt will be additionally held together under a prevailing torque by a thread interference which will resist untorqing and hence resist loosening from vibration.

With standard, non-distorted thread forms, the nut member is free running at low torque values onto the bolt or stud until workpiece engagement and initial clamp or preload on the workpieces. Thereafter the final clamp load attained relative to the magnitude of applied torque is resisted mainly by the inherent friction between the engaged portions, such as the threads, of the rotating members under load. This is not the case with threaded fasteners having a distorted thread form to provide a prevailing torque function. Here once the distorted thread portion is engaged by the mating threads the nut member is no longer free running and the clamp load of the workpieces being fastened relative to the magnitude of the applied torque is reduced. While the distortion of the thread form is often placed at the outer or trailing end of the nut, this still restricts the free running capability of the nut member onto the stud or bolt and the magnitude of initial preload and final clamp load relative to the applied torque. In addition the mating engagement between the distorted and undistorted threads may be somewhat grip sensitive over the grip range, i.e. with grip range being the variation in total thickness of workpieces, from a maximum grip or maximum total thickness to a minimum grip or minimum total thickness, and to be secured together by a single sized fastener. Thus in such systems the relationship between the magnitude of applied torque and the magnitude of final clamp load on the workpieces may be compromised The present invention provides a unique nut and bolt assembly which not only provides a reliably predictable and verifiable magnitude of final clamp load but also provides an anti-loosening or prevailing torque type self-locking feature. Thus the fastener has a nut assembly which includes a threaded nut member with a separate non-threaded lock base secured or otherwise operatively connected thereto. The lock base has a load ring portion with an axially extending, collapsible boss by which it is operatively connected to the nut member and through which the clamp load is applied. As connected to the nut member the load ring portion is spaced from the nut member by a predetermined axial gap as determined by the length of the boss. As will be seen the boss is of a generally tubular construction. The nut assembly is substantially free running on an associated bolt or stud and permits clamping of the workpieces up to a first magnitude of torque. In this regard since the lock base is not threaded, the threaded action is between the nut member and the bolt or stud. The first magnitude of torque will provide a desired magnitude of initial clamp load or preload on the workpieces with the clamp load applied through column loading of the boss by the nut member. After this first magnitude of torque is attained in a substantially free running step, the axial force and column load applied to the boss increases in response to increased torque. At a second magnitude of torque the axial force is increased to a magnitude at which the boss collapses and is compressively deformed whereby the nut member moves towards the load ring portion of the lock base. The magnitude of axial force at which the boss collapses is determined by the known strength of the boss and hence will result in a determinable magnitude of clamp load. The torque and hence clamp load is continued to be increased deforming the boss radially into the threads of the mating bolt or stud with a high radial, compressive force. The torque is further increased until a third magnitude of torque is attained at which the gap between the nut member and the ring portion is substantially closed and at which point the installation is completed. The result is a fastened joint with the workpieces held together under a preselected magnitude of final clamp load. This final magnitude of clamp load is confirmed by the closure of the gap which occurs after the boss collapses at a predictable relative axial load applied between the nut assembly and bolt. It is this relative axial load which is in essence the clamp load. At the same time threads of the nut: member and the newly formed thread of the lock base engaged with the bolt or stud of the installed fastener are held together under a high radial, compressive load resulting in an anti-loosening, high prevailing torque type lock structure which provides resistance to removal and hence a desired resistance to loosening from vibration or other cyclic loading. In this regard it should be noted that, unlike conventional prevailing torque structures, here there is no thread distortion inhibiting free running of the nut and the attainment of a first, determinable magnitude of clamp load. The anti-loosening or prevailing torque type lock feature occurs upon collapse of the boss into compressive engagement with the bolt threads after the first magnitude of clamp load has been attained. It should also be noted that additional torque could be applied after gap closure to further increase the clamp load after gap closure. In this case the determination of the magnitude of final clamp load would be more readily predictable by measuring the amount of relative rotation applied between the nut assembly and bolt. In the fastener of the present invention, the connection between the nut member and lock base is such that rotation of the lock base by the nut member in installation is essentially precluded.

As will be seen this is a completely different concept from prior threaded fasteners having a lock nut having a neck connected to a washer by a frangible portion with the neck adapted to move into the washer bore to form a lock. See in this regard the U.S. Pat. No. 2,380,944 to Pummill for "SELF-LOCKING NUT OR BOLT" and U.S. Pat. No. 2,520,259 to Pummill for "SELF-LOCKING NUT AND WASHER". See also U.S. Pat. No. 1,464,591 to Weichold, Jr. for "LOCK NUT".

Thus in a preferred form of the present invention the nut assembly includes a nut member and a separate lock base with the clamp load being determined by a deformable or collapsible cylindrical boss on the lock base and with the radially compressive load applied to the threads of the bolt occurring after the boss has collapsibly deformed upon attainment of a determinable magnitude of clamp load.

The unique nut assembly of the present invention can be utilized with a variety of thread forms including generally standard thread forms available on existing bolts or studs.

The free running capability, determinable clamp load and resultant anti-loosening or prevailing torque type lock characteristic of the unique nut assembly are desirable for many industrial and aerospace applications and will be substantially uniformly operative over the grip range of the related fastener.

Thus it is an object of the present invention to provide a unique threaded fastener for securing workpieces together with a final clamp load which is determinable and visibly verifiable.

It is also an object of the present invention to provide a unique threaded fastener which, upon installation, has a desired anti-loosening or prevailing torque type lock characteristic.

It is another object of the present invention to provide a unique threaded fastener assembly for securing workpieces together and including a threaded bolt or stud and a free running nut assembly adapted to provide a preselected magnitude of initial preload on the workpieces without added interference or frictional loads between the engaging threads and to subsequently provide an anti-loosening or prevailing torque type lock characteristic upon attainment of a final, determinable clamp load.

It is still another object of the present invention to provide a unique threaded fastener assembly for securing workpieces together and including a threaded bolt or stud and a free running nut assembly adapted to provide a preselected magnitude of initial preload on the workpieces without added interference or frictional loads between the engaging threads and to subsequently provide a final clamp load on the workpieces which is determinable and visibly verifiable and also providing an anti-loosening or prevailing torque type lock characteristic upon attainment of the determinable final clamp load.

Other objects, features, and advantages of the present invention will become apparent from the subsequent description and the appended claims, taken in conjunction with the accompanying drawings, in which:

DESCRIPTION OF THE DRAWINGS

FIG. 2 is a side elevational view of the nut assembly of FIG. 1 showing the nut member and lock base as secured together in an assembled relationship;

FIG. 2A is a fragmentary side elevational view of a modified portion of the nut assembly of FIG. 2 shown in the Circle 2A and depicting an alternative structure for holding the nut member and lock base together in assembled relationship;

FIG. 3 is a side elevational view, with the nut assembly shown in section, depicting the nut assembly of FIG. 2 in assembly relationship with a bolt and workpieces to be secured together after initial preload of the workpieces by the fastener assembly with the workpieces representing a maximum grip condition;

DESCRIPTION OF EMBODIMENTS OF THE INVENTION

Figure 1:
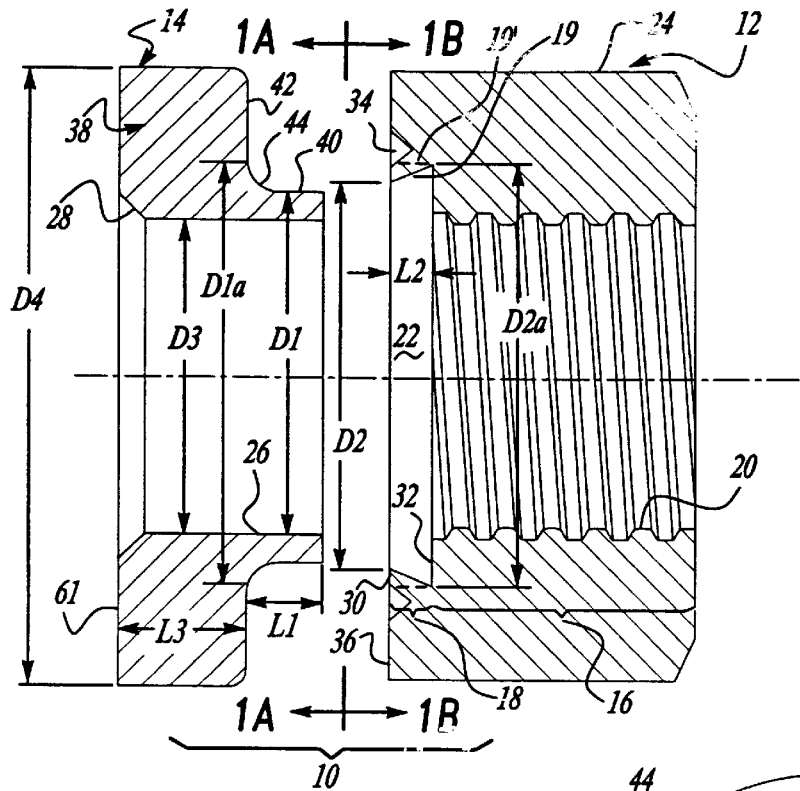
FIG. 1 is a side elevational, sectional view of one form of a nut assembly embodying features of the present invention and including a nut member and a lock base shown prior to assembly together.
Figure 1A:
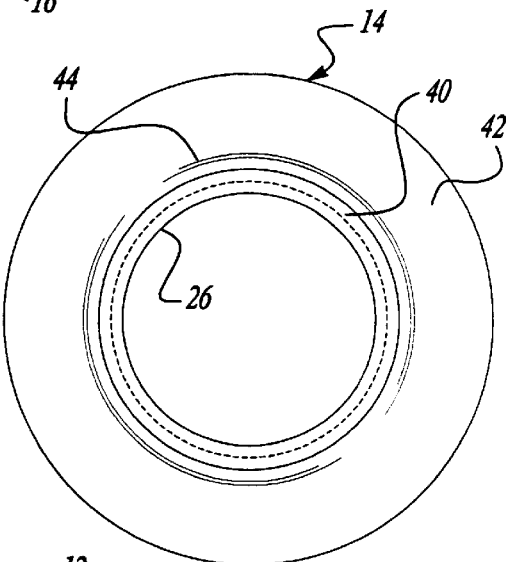
FIG. 1A is an end view of the lock base of the nut assembly of FIG. 1 taken generally in the direction of the Arrow 1A.
Figure 1B:
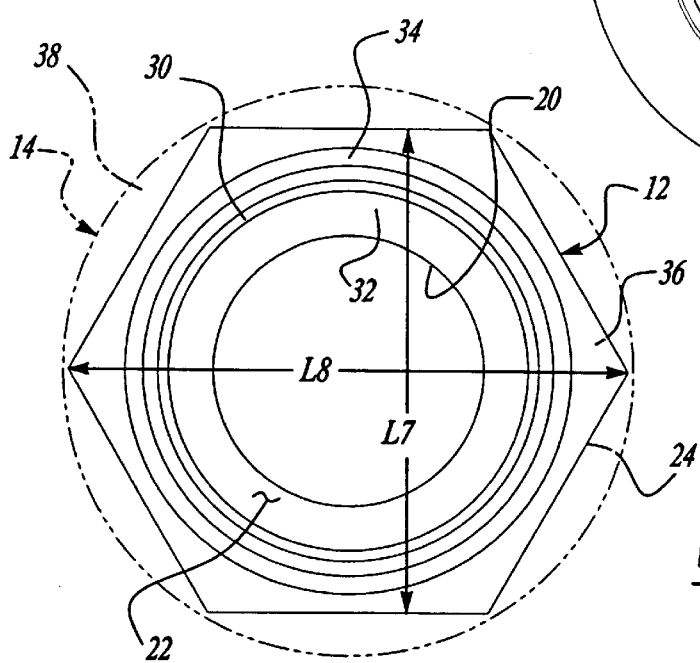
FIG. 1B is an end view of the nut member of the nut assembly of FIG. 1 taken generally in the direction of the Arrow 1B, with the outer surface of the load ring portion of the lock base superimposed and shown in phantom lines.

Looking now to FIG. 1 of the drawings, a nut assembly 10 is shown in its preassembled state and includes a nut member 12 and a lock base member 14. The nut member 12 includes a threaded body portion 16 at its outer end and a retention portion 18 at its inner end. The threaded body portion 16 has a threaded through bore 20 which is in communication with an enlarged counterbore 22 in the retention portion 18. The nut member 12 has a hex shaped outer surface 24 to facilitate engagement by a socket tool of a well known or standard construction whereby torque can be applied to the nut assembly 10 (see FIG. 1B). The lock base member 14 is of an annular configuration having a generally circular cross-section with a smooth through bore 26 of a preselected diameter D3. The bore 26 terminates at its inner end in an enlarged chamfered counterbore 28.

Looking now to FIG. 1, the counterbore 22 of retention portion 18 has its radial wall 19 tapering radially inwardly from its forward end to its rearward end to define a retention ring 30 with a reverse taper. The retention ring 30 is spaced radially outwardly from the threaded bore 20 of threaded body portion 16 to define a generally planar engagement wall 32 at the inner end of the counterbore 22. The reverse taper of the radial wall 19 of retention ring 30 can be formed by first making the counterbore 22 to have a generally axially straight radial wall, shown in dotted lines as 19' in FIG. 1, and then moving the material radially inwardly by stamping a circular, V-shaped slot 34 into the axially inner surface 36 of the nut member 12. Alternatively, the reverse taper of radial wall 19 could be formed by machining.

The lock base member 14 has an enlarged diameter load ring portion 38 with a reduced diameter boss 40 extending axially from its axially forward surface 42. In its preassembled condition as shown in FIG. 1 the boss 40, which is of a generally tubular construction, has a radially outer surface with a generally uniform diameter D1 which is connected to the forward surface 42 of load ring portion 38 by a fillet radius 44 which increases to a maximum diameter D1a at the surface 42. The tapered or radiused fillet 44 is provided to reduce stress concentrations at the juncture of the boss 40 with the load ring portion 38 and also to resist any shear loads at that juncture as well as column buckling.

The lock base member 14 is adapted to be assembled to the nut member 12 by first locating the boss 40 in the counterbore 22 with the outer end of boss 40 engaging the engagement wall 32. The axial length L1 of the boss 40 is greater than the depth L2 of the counterbore 22 so that in this preassembled condition the forward surface 42 of the lock base member 14 is spaced from the inner surface 36 of the nut member 12. In one form of the invention the minimum diameter D2 at the rearward end of the retention ring 30 was greater than diameter D1 of the boss 40 such as to receive the boss 40 in the counterbore 22 with a slight clearance fit. Next the nut member 12 and lock base member 14 are partially pressed together with the boss 40 being deformed radially outwardly by column loading into the annular cavity of the counterbore 22 of the retention ring 30. The lock base member 14 then is held to the nut member 12 by the engagement of the deformed portion of the boss 40 with the reverse taper of the radial wall 19. In this assembled state of the nut assembly 10, as shown in FIG. 2, the surfaces 36 and 42 are still spaced a preselected axial distance "d" to permit additional, final deformation of the boss 40 to provide a lock with an associated bolt or stud in a manner to be described. The distance "d" will provide a gap which because of the deformation of the boss 40 upon pre-assembly will be slightly less than the difference of L1-L2. In this regard, the maximum diameter D1a of the fillet 44 of boss 40 is less than the minimum diameter D2 of retention ring 30 so that in the final deformation step the surfaces 36 and 42 can be brought into engagement without significant or detrimental engagement between the fillet 44 and the radially inner end of retention ring 30.

An alternate structure for assembling the nut member 12 and lock base member 14 is shown in FIG. 2A. In the embodiment of FIG. 2A components similar to like components in FIG. 2 have been given the same numeral designation with the addition of the letter postscript "a". Thus in FIG. 2A the outer end of the boss 40a is compressively deformed to partially fill the annular cavity of the counterbore 22a to thereby hold the nut member 12a and lock base member 14a in assembled condition.

In this regard the assembly of the lock base member 14 to the nut member 12 as shown in FIGS. 2 and 2A with the initial distortion of the boss 40, 40a in the counterbore 22, 22a and as described above secures the lock base member 14, 14a to the nut member 12, 12a with little additional resultant frictional engagement in the relative rotation between the nut member 12, 12a and lock base member 14, 14a during installation. Thus there is essentially no rotation of the lock base member 14 by the nut member 12 during installation.

While the retention ring 30 in the embodiment shown is a complete circle, it should be understood that it could be constructed to have a plurality of circumferentially spaced segments formed by a plurality of circumferentially spaced V-shaped slots. In the event such a segmented retention ring is utilized it could be adapted to provide an interference fit with the boss 40 by the resilient movement of the retention ring segments whereby the lock base member 14 could be held to the nut member 12 without deformation of the outer end of the boss 40. The interference fit, however, would be such as to result in only a nominal amount of additional friction in the relative rotation between the nut member 12 and lock base member 14. With this type of assembly without deformation of the boss 40, the distance "d" of the gap will substantially be the difference of L1-L2. In this regard, it can be seen that there can be other means for securing the boss 40 to the nut member 12. Also the lock base member 14 could be operatively associated with the nut member 12 without being positively or even frictionally fixed to it.

Looking now to FIG. 3, the nut assembly 10 is shown in assembled relationship with a bolt 46 to define a fastener assembly 48 with the fastener assembly 48 shown in the process of securing workpieces 50 and 52 together. The bolt 46 has an elongated shank 54 with an enlarged protruding head 56 at one end and a threaded shank portion 58 at the opposite end. A smooth shank portion 59 connects the threaded portion 58 with the bolt head 56. The shank 54 of the bolt 46 is adapted to extend through aligned openings or bores 60 and 62 in the workpieces 50 and 52, respectively. The threaded shank portion 58 has a substantially uniform thread form adapted to matingly engage the threads of the threaded bore 20 of the nut member 12. In installing the fastener assembly 48, the nut assembly 10 can be initially applied to the bolt 46 by hand to thread the nut member 12 onto the threaded portion 58 of the bolt shank 54. In this regard, the diameter D3 of the through bore 26 of the lock base member 14 is in clearance relationship with the threaded portion 58 of the bolt shank 54 with the chamfered counterbore 28 facilitating initial assembly of the nut assembly 10 onto the bolt shank 54.

Next and as shown in FIG. 3, the nut assembly 10 can be threadably secured onto the threaded portion 58 by torque being applied via the hex shaped surface 24 of nut member 12 by a suitable torque or turning tool (not shown) with the inner surface 61 of load ring portion 38 engaging the outer surface 63 of workpiece 50 to clamp the workpieces 50 and 52 together under a preselected magnitude of initial preload or clamp load. The preload or clamp load is applied through column loading of the boss 40. Note, however, that at this juncture the boss 40 is in clearance relationship with the threads of the threaded portion 58 of bolt 46 and has not been substantially deformed further and the gap "d" between the confronting surfaces 36 and 42 is still substantially maintained. Thus up to this point the nut assembly 10 is essentially free running on the threaded portion 58 of the bolt shank 54.

Next additional torque is applied by a torque or turning tool until a second magnitude of torque is attained at which time the tubular boss 40 is axially compressed and collapses and deforms radially inwardly to substantially fill the volume defined by the counterbore 22 and the confronting portion of the threaded bolt shank portion 58. This will provide a determinable level of initial clamp load on the workpieces 50 and 52. Additionally as this occurs some of the material of the boss 40 will be moved into compressive engagement with the threads of threaded bolt shank portion 58. At the same time the nut member 12 now moves axially towards the load ring portion 38 until the inner surface 36 of the nut member 12 is substantially in engagement with the forward surface 42 of the load ring portion 38. It should be noted that the volume of the cavity defined by the counterbore 22 is less than the volume of the material of boss 40 whereby some of the material of the boss 40 as additionally deformed will be moved radially inwardly into engagement with the threads of the threaded bolt shank portion 58 to at least partially fill the confronting thread root and to define an additional, limited thread in engagement with the bolt thread. See FIGS. 4 and 5. At the same time, the column load on the boss 40 can cause some of the adjacent material from the bore 26 to also move into compressive engagement with the bolt threads. At this juncture a desired magnitude of clamp load or preload on workpieces 50 and 52 is attained by the application of this second predetermined magnitude of torque. At the same time, the nut assembly 10 and bolt 46 are rotatably held together by the compressive engagement of the material of the boss 40 and additionally from bore 26 with the threads of threaded shank portion 58 of the bolt 46. If desired the magnitude of torque can now be increased to a final predetermined magnitude to provide a final magnitude of clamp of workpieces 50 and 52 or, alternatively, a predetermined, desired amount of relative rotation between the nut member 12 and bolt 46 could be applied to provide a more predictable final magnitude of clamp load on the workpieces 50 and 52. With the construction of the nut member 12 and lock base member 14 as shown and described there is essentially no rotation of the lock base member 14 by the nut member 12 during installation.

In order to provide a more positive bond or lock between the bolt 46 and nut assembly 10, the threaded shank portion 58 of bolt 46, in some instances, may be provided with an axially extending slot or groove 65 adapted to receive some of the deformed material from the boss 40 and the bore 26. The length of the groove 65 can be limited generally to the area of deformation of the material of the boss 40 into the threads of the threaded shank portion 58. In one form, the radial depth of the lock groove 65 is slightly less than the depth of the thread crests so that it does not engage the root portion of the thread. It should be understood that the phrase "prevailing torque type lock" encompasses all of the anti-loosening features previously noted including the compressive engagement of the deformed material of the lock base member 14 into the threads of threaded shank portion 58 alone or also into the lock groove 65.

With the above construction the substantial closure of the gap by the noted engagement of confronting surfaces 36 and 42 which occurs generally at final installation provides for a ready means of visual inspection and verification that the boss 40 has collapsed at a determinable column load and hence that at least a desired minimum magnitude of clamp load on the workpieces 50 and 52 has been attained. This also provides assurance that the engagement between the deformed boss 40 and engaged threads of threaded shank portion 58 and/or the lock groove 65 is complete and is maximized to provide a desired prevailing torque and/or lock to resist loosening. It should be understood, however, that additional means could be provided for magnifying the verification of gap closure such as projections or a transferable coating on the inner nut member surface 36 to provide a visible engagement mark on the forward load ring surface 42. In this regard verification could be provided by virtue of a substantial closure of a gap between the inner surface 36 of the nut member and the confronting surface 63 of workpiece 50.

The lock base member 14 can be made of a somewhat softer material than that of the nut member 12 and bolt 46. Thus the boss 40 can deform to the shape of the threads on the threaded shank portion 58 of the bolt 46 as the boss 40 is compressed. At the same time the engaged threads of the shank portion 58 of the bolt 46 will remain substantially undistorted. Alternatively, the boss 40 could be of a lower hardness than that of the load ring portion 38, the nut member 12 and bolt 46.

Figure 3A:
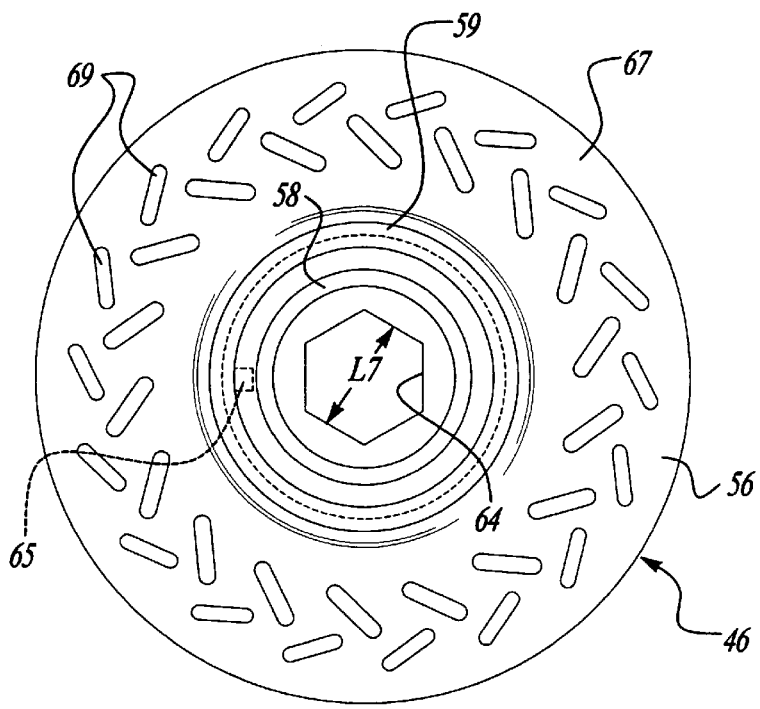
FIG. 3A is an end view, to reduced scale, of the bolt of FIG. 3 in a pre-assembled condition relative to the nut assembly and as taken in the dire ion of the Arrow 3A in FIG. 3.

Looking now to FIG. 3A, in order to facilitate the application of torque between the nut member 12 and the bolt 46 and to prevent the bolt from spinning in the workpiece bores 60 and 62, the outer end of the bolt shank 54 can be provided with a hex socket or bore 64 of standard size and shape or other irregularly shaped bore which can receive a similarly shaped rod on the installation tool (not shown). The tool rod is fixed from rotation such that only the hex shaped socket portion of the tool which engages the hex shaped surface 24 of nut member 12 will be rotated thereby preventing the nut member 12 and bolt 46 from spinning together in the workpiece bores 60, 62. Such spinning could result in undesirable galling of the workpiece bores such as bores 60, 62. The details of such a tool are within the purview of one skilled in the art and do not constitute a part of the present invention and thus have been omitted for purposes of simplicity. One form of such installation tool can be of a hydraulic or pneumatic impact type wrench. Such impact wrenches apply torque by a series of impact pulses with the pressure and/or torque being at least partially reduced between pulses.

In addition, the underside surface 67 of the bolt head 56 can be provided with a plurality of raised anti-rotation bars 69 formed near the radially outer end of the surface 67. The raised bars 69 when engaged with the confronting outer surface 71 of workpiece 52 will resist rotation of the bolt 46 relative to the workpieces 50, 52. This rotation resistance will assist the anti-rotation connection between the hex tool rod and hex socket bore 64 and will thereby reduce the load applied to the tool rod permitting its size to be minimized along with the size of hex bore 64 and will also enhance the life of the hex rod.

The anti-loosening or high prevailing torque type lock feature is provided with substantially little or no permanent distortion of the threads of the bolt 46 and nut member 12. Thus, if desired, the fastener assembly 48 can be threadably separated and removed from the workpieces 50 and 52 after installation.

Figure 4:
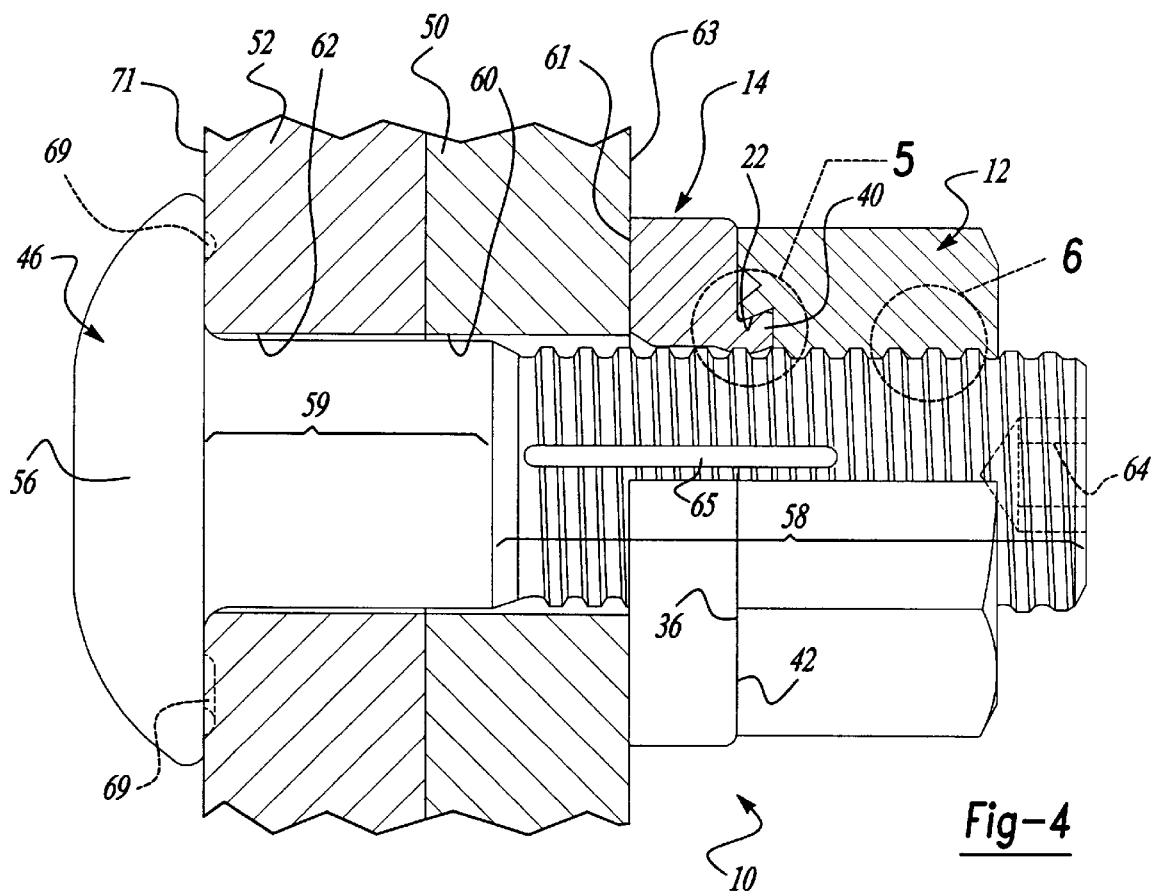
FIG. 4 is a side elevational view similar to FIG. 3 depicting the fastener assembly including the nut assembly and the bolt in the final installed condition for the workpieces of maximum grip for that fastener assembly.
Figure 5:
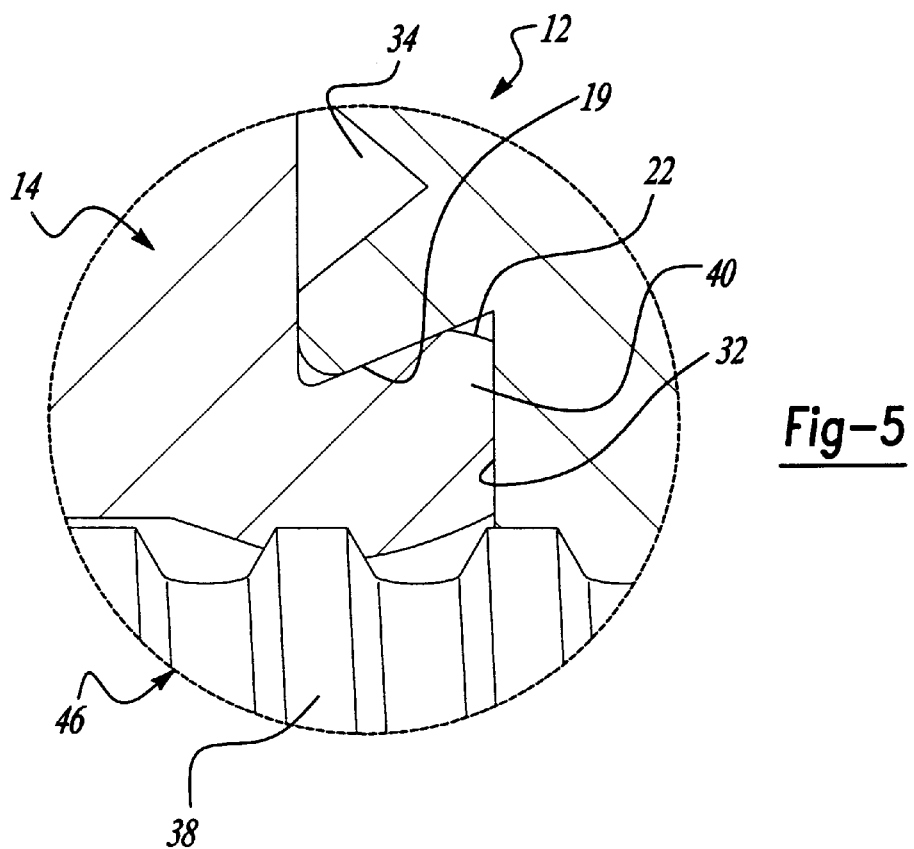
FIG. 5 is a fragmentary sectional view to enlarged scale of that portion of the fastener assembly shown in the Circle 5 in FIG. 4.

It is desirable that the fastener assembly 48 be utilized to secure workpieces, such as workpieces 50 and 52, over a reasonable grip range. The grip range of a fastener assembly, such as fastener assembly 48, is defined, as previously noted, as the difference between the maximum and minimum total thicknesses of workpieces, such as workpieces 50 and 52, which the same fastener assembly is capable of securing together. In FIGS. 3 and 4, the fastener assembly 48 is shown securing workpieces 50 and 52 which are near the maximum total thickness or maximum grip for that fastener assembly 48. In this regard it can be seen that the smooth shank portion 59 of bolt 46 is of a length sufficient to extend from the bolt head 56 for the remaining full length of the total thickness of the workpieces 50 and 52. In certain applications the length of the threaded portion 58 can be minimized to provide full engagement with substantially all of the 5 threads of the threaded body portion 16 of nut member 12 at the initial clamp up of the workpieces 50 and 52 as shown in FIG. 3 and full engagement at final clamp up as shown in FIG. 4. At the same time the length of threaded shank portion 58 can be selected such that essentially none of the threaded portion 58 will be located within the workpiece bore 60.

In the embodiment of the invention shown, the form of the threads of the threaded shank portion 58 of bolt 46, can be of the shallow type as shown and described in the U.S. Pat. No. 5,090,852 issued on Feb. 25, 1992 to Richard D. Dixon for High Strength Fastener and Method. Accordingly, the threads of the threaded shank portion 58 would have root portions which are of a simulated streamlined or elliptical shape as taught in the '852 patent and in this regard the disclosure of that patent is incorporated herein by reference. The nut member, such as nut member 12, would have mating threads of similar contour.

Figure 6:
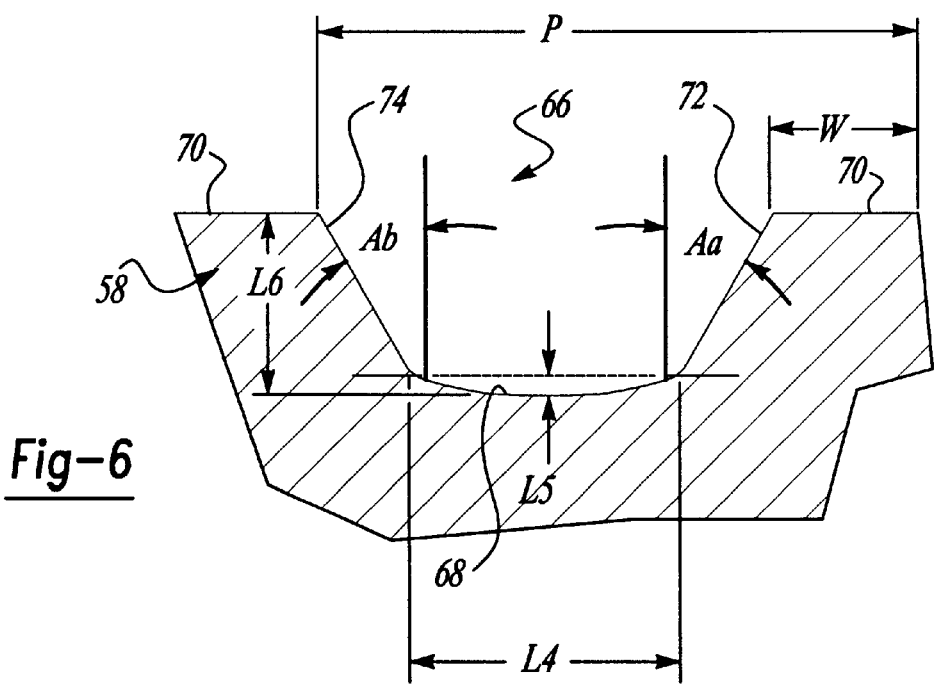
FIG. 6 a fragmentary sectional view to enlarged scale depicting the thread formation of the bolt member in the Circle 6 of FIG. 4 for a preferred form of the invention.

In this regard the thread form on the shank portion 58 of bolt 46 is shown in FIG. 6 and has a root 66 having a root portion 68 with a contour of a portion of an ellipse which has a length L4 and is connected to separate thread crests 70 by leading and trailing flanks 72 and 74 respectively. The flanks 72 and 74 are angulated at angles Aa and Ab, respectively, which in one form of the invention were substantially equal. It should be understood, however, that other thread forms including standard thread forms could be used.

In one form of the invention the fastener assembly 48 for a nominal ⅝ inch fastener was constructed as follows:

| A. | | Nut Member 12 | |
|---|---|---|---|
| | 1. | Material | 1038/1137 Steel, Hardness around Rc30 to around Rc38 |
| | 2. | Counterbore 22 | |
| | | Diameter D2 | .775 inches |
| | | Diameter D2a | .830 inches |
| | | Depth L2 | .080 inches |
| | 3. | Threaded Body Portion 16 | |
| | | Major Diameter (root) | .633 inches |
| | | Minor Diameter (crest) | .584 inches |
| | | L7 across flats | 1.046 inches |
| | | L8 across peaks | 1.227 inches |
| B. | | Lock Base Member 14 | |
| | 1. | Material | 1010 Steel Hardness around Rb40 to around Rb100 |
| | 2. | Boss 40 | |
| | | Length L1 | .150 inches |
| | | Diameter D1 | .750 inches |
| | | Diameter D1a | .772 inches |
| | | Wall thickness (D1-D3)/2 | .055 inches |
| | 3. | Through Bore 26 | |
| | | Diameter D3 | .640 inches |
| | 4. | Load Ring Portion 38 | |
| | | Diameter D4 | 1.250 inches |
| | | Length L3 | .250 inches |
| | 5. | Gap distance d | .065 inches |
| C. | | Bolt 46 | |
| | 1. | Material | 1038 Steel Hardness around Rc27 to around Rc35 |
| | 2. | Thread | |
| | | Crest Diameter | .622 inches |
| | | Root Diameter | .573 inches |
| | | Ellipse Length L4 | .0373 inches |
| | | Ellipse Height L5 | .0042 inches |
| | | Crest Width W | .030 inches |
| | | Thread Depth L6 | .0245 inches |
| | | Flank Angles Aa, Ab | 30° |
| | | Thread Pitch P | .0922 inches |
| | 3. | Hex Socket 64-distance L7 across the flats | 5/16 inch |

As previously noted, there is essentially no rotation of the lock base member 14 by the nut member 12 during installation. Thus it is believed desirable that the rotation of the lock base member 14 by the nut member 12 be inhibited and thus that the friction between the nut member 12 and the lock base member 14 when placed under load during relative rotation in the installation process be minimized. This can be assisted by providing a high degree of lubricity between the engaging portions of the nut member 12 and lock base member 14 and also as to the threaded engagement between the nut member 12 and the threaded shank portion 58 of the bolt 46.

Thus in order to reduce the frictional resistance between the nut member 12 and lock base member 14 under load during installation and also to minimize the installation torque loads and thus assist in the consistent, proper installation and functioning of the fastener assembly 48, the nut member 12 and lock base member 14 are plated with an electro-corrosion resistant zinc plating.

Next a wax type lubricant is also applied to the nut member 12 and lock base member 14. The wax type lubricant can be of a well known type such as a water dilutable wax emulsion containing a blend of microcrystaline polyethelene wax and/or natural and synthetic waxes.

At the same time in some applications it may be desirable that rotation between the lock base member 14 be further inhibited by also providing resistance to rotation between the lock base member 14 and the engaged surface 63 of workpiece 50 be inhibited. Thus the lubrication coatings applied to the engaging surface 61 of the lock base member 14 can be removed and/or some type of anti-rotation roughened surface configuration such as by frictional roughening, knurling or the like could be provided at the engaging surface 61 of the lock base member 14.

As previously noted the fastener can be installed by a torque or turning tool such as a hydraulic or pneumatic impact wrench. Alternatively the fastener can be installed by a shear wrench type of tool which continuously applies torque the magnitude of which gradually increases until the installation of the fastener is completed. In one such tool the hex rod which engages the hex socket 64 of the bolt 46 is not fixed but is actuated to apply a counter torque on the bolt 46 and rotate it in an opposite direction from the hex shaped socket portion of the tool which engages the hex shaped surface 24 of the nut member 12. Such shear wrenches do not impose the force of the periodic impacts to the operator as occurs with the comparable impact wrenches. In this case, however, the installation torque is continuously applied between the hex tool rod in the hex socket 64 and the socket portion of the tool on the hex surface 24 of nut member 12 whereas in the impact type tool the bolt 46 will provide some resistance as the bolt head 56 engages the workpiece surface 71. In this regard the anti-rotation bars 69 under the bolt head 56 can be removed. Thus the forces applied to the hex socket 64 in the bolt 46 and the hex tool rod attain substantially higher magnitudes than that periodically applied by the impact type wrench. In order to resist such loads the hex tool rod of the shear wrench is somewhat larger than that of the impact tool. This also requires the hex socket 64 to be larger. For example, for the 5/8 inch fastener noted in the chart the distance L7 across the flats of the hex socket bore 64 was increased from 5/16 inch to 3/8 inch. This, of course will result in a thinner radial wall surrounding the hex socket bore 64. In order to provide sufficient strength to the radial wall it has been found desirable to increase the hardness of that segment of the bolt shank portion 58 or alternatively to increase the hardness of the bolt 46 itself. In this regard an increased hardness to at least around Rc40 is believed to be satisfactory. Of course, the hex rod would also have to be of suitable hardness and strength to accept the loads in setting the fastener.

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed is:

1. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said boss constructed such that upon its collapse the material of said boss will be directed radially inwardly into compressive engagement with the threads of said threaded portion whereby said bolt and nut assembly are locked together under a prevailing torque type lock with substantially no distortion of the material of said nut member radially into engagement with the threads of said threaded portion of said bolt.

2. The threaded fastener system of claim 1 with said nut member having a radially extending axially inner surface and said load ring having a radially extending axially forward surface in confrontation with said axially inner surface and with the confronting inner and forward surfaces being spaced apart a preselected axial distance by said boss to define a gap, said nut member in response to a second magnitude of axial load on said boss moving axially towards said load ring upon collapse of said boss to bring said confronting inner and forward surfaces substantially into engagement to substantially close said gap and to thereby provide a verifiable indication of the magnitude of clamp load on said workpieces.

3. The threaded fastener system of claim 1 with said through bore of said lock base member extending through said load ring and said boss with a generally uniform diameter whereby said boss is substantially axially supported by the adjacent axially extending material of said load ring.

4. The threaded fastener system of claim 1 with said bolt shank having an irregularly shaped cavity at its outer end adapted to receive a mating rod from an installation tool whereby the rotation of said bolt with and in the same direction of the nut member during installation is resisted.

5. The threaded fastener system of claim 1 with said bolt shank having an irregularly shaped cavity at its outer end adapted to receive a mating rod from an installation tool whereby the rotation of said bolt with and in the same direction as the nut member during installation is resisted and at the same time a torque can be simultaneously applied to said bolt in a direction opposite to that applied to said nut member, said cavity being provided of a relatively large size to receive a similarly sized mating rod whereby the magnitude of torque reacted between said bolt and said nut member can be maximized, at least said outer end of said bolt shank being of an increased hardness for the cavity to withstand the applied torque through the mating rod.

6. The threaded fastener system of claim 1 with said nut member and said lock base member including connecting means for operatively securing said nut member and said lock base member together prior to installation while permitting said nut member to rotate relative to said lock base member.

7. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said boss constructed such that upon its collapse the material of said boss will be directed radially inwardly into compressive engagement with the threads of said threaded portion whereby said bolt and nut assembly are locked together under a prevailing torque type lock, said load ring having a radially extending axially forward surface, said boss having a generally circumferentially extending radially outer surface of generally uniform diameter, said radially outer surface of said boss connected to said forward surface of said load ring by a fillet of increasing diameter for providing an increased wall thickness for said boss at its juncture with said load ring to resist deformation resulting from the column loading of said boss.

8. The threaded fastener system of claim 7 with said nut member and said lock base member including connecting means for operatively securing said nut member and said lock base member together prior to installation while permitting said nut member to rotate relative to said lock base member.

9. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said boss constructed such that upon its collapse the material of said boss will be directed radially inwardly into compressive engagement with the threads of said threaded portion whereby said bolt and nut assembly are locked together under a prevailing torque type lock, said counterbore in said nut member having a radial retaining wall extending axially inwardly and tapering radially outwardly, said boss having its axially outer end located in said counterbore with an enlarged portion providing an interference with said radial wall whereby said nut member and said lock base are held together as a unit.

10. The threaded fastener system of claim 9 with said retaining wall formed by an axial indentation in said nut member generally surrounding said retaining wall.

11. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said boss constructed such that upon its collapse the material of said boss will be directed radially inwardly into compressive engagement with the threads of said threaded portion whereby said bolt and nut assembly are locked together under a prevailing torque type lock, said bolt shank of said bolt having an axially extending slot adapted to receive material of said boss moved radially inwardly into compressive engagement with the threads of the threaded portion to further lock said nut member and said bolt together.

12. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said boss constructed such that upon its collapse the material of said boss will be directed radially inwardly into compressive engagement with the threads of said threaded portion whereby said bolt and nut assembly are locked together under a prevailing torque type lock, said bolt having an enlarged head adapted to engage the confronting surface of one of the workpieces, said bolt head having an irregular surface on its side engaging said confronting surface to resist rotation of said bolt in said aligned bolt openings.

13. The threaded fastener system of claim 12 with said bolt shank having an irregularly shaped cavity at its outer end adapted to receive a mating rod from an installation tool whereby the rotation of said bolt with and in the same direction of the nut member during installation is resisted.

14. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said boss constructed such that upon its collapse the material of said boss will be directed radially inwardly into compressive engagement with the threads of said threaded portion whereby said bolt and nut assembly are locked together under a prevailing torque type lock, said lock base member being operatively connected to said nut member whereby rotation of said lock base member by said nut member during installation is generally precluded.

15. The threaded fastener system of claim 14 with said lock base member and said nut member having their mutually engaging surfaces lubricated to inhibit rotation of said lock base member by said nut member.

16. The threaded fastener system of claim 14 with said load ring member having an engaging surface adapted to engage the confronting surface on the outer workpiece upon installation, said engaging surface being roughened to inhibit rotation of said lock base member by engagement of said engaging surface with the confronting surface of the outer workpiece.

17. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end and an enlarged bolt head at its opposite end, said nut assembly including a nut member and a lock base member, said nut member having a threaded through bore adapted to threadably engage the threads of said threaded portion of said bolt shank, said lock base member having a load ring with a reduced diameter boss extending axially from the outer end of said load ring, said lock base member having a through bore extending through said load ring and said boss and adapted to receive said bolt shank in a clearance relationship, said lock base member operatively connected to said nut member, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss, said boss adapted to collapse at a preselected magnitude of axial load resulting from the torque applied between said nut member and said bolt, said boss constructed such that upon its collapse material of said boss will be directed radially inwardly into compressive engagement with the threads of said threaded portion whereby said bolt and nut assembly are locked together under a prevailing torque type lock with substantially no distortion of the material of said nut member radially into engagement with the threads of said threaded portion of said bolt.

18. The threaded fastener system of claim 17 with said nut member having a radially extending axially inner surface and said load ring having a radially extending axially forward surface in confrontation with said axially inner surface and with the confronting inner and forward surfaces being spaced apart a preselected axial distance by said boss to define a gap, said nut member in response to a second magnitude of axial load on said boss moving axially towards said load ring upon collapse of said boss to bring said confronting inner and forward surfaces substantially into engagement to substantially close said gap and to thereby provide a verifiable indication of the magnitude of clamp load on said workpieces.

19. The threaded fastener system of claim 17 with said nut member and said lock base member including connecting means for operatively securing said nut member and said lock base member together prior to installation while permitting said nut member to rotate relative to said lock base member.

20. A threaded fastener system for securing a plurality of workpieces together said system comprising:

a bolt having an elongated shank adapted to be located in aligned openings in workpieces to be secured together with said shank having a threaded portion at its outer end, a nut member having a threaded through bore adapted to threadably engage the threads of said threaded portion of said bolt shank, a tubular member having a through bore adapted to receive said bolt shank in a clearance relationship and located between the adjacent one of said workpieces and said nut member and operatively connected with said nut member, said nut member adapted to be threaded onto said threaded portion of said bolt shank and operative against said tubular member with the resultant axial clamp load being applied to the workpieces from said nut member through column loading of said tubular member, said tubular member adapted to collapse at a preselected magnitude of axial load resulting from the torque applied between said nut member and said bolt, said tubular member constructed such that upon its collapse material of said tubular member will be directed radially inwardly into compressive engagement with the threads of said threaded portion whereby said bolt and nut member are secured together under a prevailing torque type lock with substantially no distortion of the material of said nut member radially into engagement with the threads of said threaded portion of said bolt.

21. The threaded fastener system of claim 20 with said nut member having a radially extending axially inner surface and with said inner surface being spaced from the confronting workpiece a preselected axial distance by said tubular member to define a gap, said nut member in response to a second magnitude of axial load on said tubular member moving axially towards said confronting workpiece upon collapse of said tubular member to substantially close said gap and to thereby provide a verifiable indication of the magnitude of clamp load on said workpieces.

22. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said nut member having a radially extending axially inner surface and said load ring having a radially extending axially forward surface in confrontation with said axially inner surface and with the confronting inner and forward surfaces being spaced apart a preselected axial distance by said boss to define a gap, said nut member in response to a second magnitude of axial load on said boss moving axially towards said load ring upon collapse of said boss to bring said confronting inner and forward surfaces substantially into engagement to substantially close said gap and to thereby provide a verifiable indication of the magnitude of clamp load on said workpieces, said nut member constructed such that closure of said gap occurs substantially independently of any distortion of said nut member.

23. The threaded fastener system of claim 22 with said through bore of said lock base member extending through said load ring and said boss with a generally uniform diameter whereby said boss is substantially axially supported by the adjacent axially extending material of said load ring.

24. The threaded fastener system of claim 22 with said bolt shank having an irregularly shaped cavity at its outer end adapted to receive a mating rod from an installation tool whereby the rotation of said bolt with and in the same direction of the nut member during installation is resisted.

25. The threaded fastener system of claim 24 with the crests of the axially outer end of said threaded portion of said bolt shank being of a slightly reduced diameter at its axially outer end and in the area of said cavity whereby initial engagement of said nut member with said threaded portion of said bolt shank is facilitated.

26. The threaded fastener system of claim 22 with said bolt shank having an irregularly shaped cavity at its outer end adapted to receive a mating rod from an installation tool whereby the rotation of said bolt with and in the same direction as the nut member during installation is resisted and at the same time a torque can be simultaneously applied to said bolt in a direction opposite to that applied to said nut member, said cavity being provided of a relatively large size to receive a similarly sized mating rod whereby the magnitude of torque reacted between said bolt and said nut member can be maximized, at least said outer end of said bolt shank being of an increased hardness for the cavity to withstand the applied torque through the mating rod.

27. The threaded fastener system of claim 26 with the crests of the axially outer end of said threaded portion of said bolt shank being of a slightly reduced diameter at its axially outer end and in the area of said cavity whereby initial engagement of said nut member with said threaded portion of said bolt shank is facilitated.

28. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said nut member having a radially extending axially inner surface and said load ring having a radially extending axially forward surface in confrontation with said axially inner surface and with the confronting inner and forward surfaces being spaced apart a preselected axial distance by said boss to define a gap, said nut member in response to a second magnitude of axial load on said boss moving axially towards said load ring upon collapse of said boss to bring said confronting inner and forward surfaces substantially into engagement to substantially close said gap and to thereby provide a verifiable indication of the magnitude of clamp load on said workpieces, said load ring having a radially extending axially forward surface, said boss having a generally circumferentially extending radially outer surface of generally uniform diameter, said radially outer surface of said boss connected to said forward surface of said load ring by a fillet of increasing diameter for providing an increased wall thickness for said boss at its juncture with said load ring to resist deformation resulting from the column loading of said boss.

29. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said nut member having a radially extending axially inner surface and said load ring having a radially extending axially forward surface in confrontation with said axially inner surface and with the confronting inner and forward surfaces being spaced apart a preselected axial distance by said boss to define a gap, said nut member in response to a second magnitude of axial load on said boss moving axially towards said load ring upon collapse of said boss to bring said confronting inner and forward surfaces substantially into engagement to substantially close said gap and to thereby provide a verifiable indication of the magnitude of clamp load on said workpieces, said counterbore in said nut member having a radial retaining wall extending axially inwardly and tapering radially outwardly, said boss having its axially outer end located in said counterbore with an enlarged portion providing an interference with said radial wall whereby said nut member and said lock base are held together as a unit.

30. The threaded fastener system of claim 29 with said retaining wall formed by an axial indentation in said nut member generally surrounding said retaining wall.

31. The threaded fastener system of claim 29 with said lock base member being operatively connected to said nut member whereby rotation of said lock base member by said nut member during installation is generally precluded.

32. The threaded fastener system of claim 29 with said lock base member being operatively connected to said nut member whereby rotation of said lock base member by said nut member during installation is generally precluded, said lock base member and said nut member having their mutually engaging surfaces lubricated to inhibit rotation of said lock base member by said nut member.

33. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said nut member having a radially extending axially inner surface and said load ring having a radially extending axially forward surface in confrontation with said axially inner surface and with the confronting inner and forward surfaces being spaced apart a preselected axial distance by said boss to define a gap, said nut member in response to a second magnitude of axial load on said boss moving axially towards said load ring upon collapse of said boss to bring said confronting inner and forward surfaces substantially into engagement to substantially close said gap and to thereby provide a verifiable indication of the magnitude of clamp load on said workpieces, said bolt shank of said bolt having an axially extending slot adapted to receive material of said boss moved radially inwardly into compressive engagement with the threads of the threaded portion to further lock said nut member and said bolt together.

34. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end, said nut assembly including a nut member and a lock base member, said nut member having a threaded through bore adapted to threadably engage the threads of said threaded portion of said bolt shank, said nut member having an enlarged counter-bore at its inner end, said lock base member having a load ring with a reduced diameter boss extending axially from the outer end of said load ring, said lock base member having a through bore extending through said load ring and said boss and adapted to receive said bolt shank in a clearance relationship, said lock base member assembled to said nut member with said boss located in said counterbore, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss as a result of the relative axial force developed between said bolt and said nut member by torque applied between said nut member and said bolt, said boss adapted to collapse at a preselected magnitude of axial load resulting from the torque applied between said nut member and said bolt, said nut member having a radially extending axially inner surface and said load ring having a radially extending axially forward surface in confrontation with said axially inner surface and with the confronting inner and forward surfaces being spaced apart a preselected axial distance by said boss to define a gap, said nut member in response to a second magnitude of axial load on said boss moving axially towards said load ring upon collapse of said boss to bring said confronting inner and forward surfaces substantially into engagement to substantially close said gap and to thereby provide a verifiable indication of the magnitude of clamp load on said workpieces, said bolt having an enlarged head adapted to engage the confronting surface of one of the workpieces, said bolt head having an irregular surface on its side engaging said confronting surface to resist rotation of said bolt in said aligned bolt openings.

35. The threaded fastener system of claim 34 with said bolt shank having an irregularly shaped cavity at its outer end adapted to receive a mating rod from an installation tool whereby the rotation of said bolt with and in the same direction of the nut member during installation is resisted.

36. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end and an enlarged bolt head at its opposite end, said nut assembly including a nut member and a lock base member, said nut member having a threaded through bore adapted to threadably engage the threads of said threaded portion of said bolt shank, said lock base member having a load ring with a reduced diameter boss extending axially from the outer end of said load ring, said lock base member having a through bore extending through said load ring and said boss and adapted to receive said bolt shank in a clearance relationship, said lock base member operatively connected to said nut member, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss, said boss adapted to collapse at a preselected magnitude of axial load resulting from the torque applied between said nut member and said bolt, said nut member having a radially extending axially inner surface and said load ring having a radially extending axially forward surface in confrontation with said axially inner surface and with the confronting inner and forward surfaces being spaced apart a preselected axial distance by said boss to define a gap, said nut member in response to a second magnitude of axial load on said boss moving axially towards said load ring upon collapse of said boss to bring said confronting inner and forward surfaces substantially into engagement to substantially close said gap and to thereby provide a verifiable indication of the magnitude of clamp load on said workpieces, said nut member constructed such that closure of said gap occurs substantially independently of any distortion of said nut member.

37. A threaded fastener system for securing a plurality of workpieces together said system comprising:

a bolt and a nut assembly, said bolt having an elongated shank adapted to be located in aligned openings in workpieces to be secured together with said shank having a threaded portion at its outer end and an enlarged bolt head at its opposite end, said nut assembly including a nut member and a lock base member, said nut member having a threaded through bore adapted to threadably engage the threads of said threaded portion of said bolt shank, said lock base member having a load ring with a reduced diameter boss extending axially from the outer end of said load ring, said lock base member having a through bore extending through said load ring and said boss and adapted to receive said bolt shank in a clearance relationship, said lock base member operatively connected to said nut member, said nut member adapted to be threaded onto said threaded portion of said bolt shank with said load ring engaging the confronting surface of the adjacent workpiece and with the resultant axial clamp load being applied to the workpieces from said nut member to said load ring substantially through column loading of said boss, said boss adapted to collapse at a preselected magnitude of axial load resulting from the torque applied between said nut member and said bolt, said nut member having a radially extending axially inner surface and said load ring having a radially extending axially forward surface in confrontation with said axially inner surface and with the confronting inner and forward surfaces being spaced apart a preselected axial distance by said boss to define a gap, said nut member in response to a second magnitude of axial load on said boss moving axially towards said load ring upon collapse of said boss to bring said confronting inner and forward surfaces substantially into engagement to substantially close said gap and to thereby provide a verifiable indication of the magnitude of clamp load on said workpieces, said lock base member being operatively connected to said nut member whereby rotation of said lock base member by said nut member during installation is generally precluded.

38. The threaded fastener system of claim 37 with said lock base member and said nut member having their mutually engaging surfaces lubricated to inhibit rotation of said lock base member by said nut member.

39. The threaded fastener system of claim 37 with said load ring member having an engaging surface adapted to engage the confronting surface on the outer workpiece upon installation, said engaging surface being roughened to inhibit rotation of said lock base member by engagement of said engaging surface with the confronting surface of the outer workpiece.

40. A threaded fastener system for securing a plurality of workpieces together said system comprising:

a bolt having an elongated shank adapted to be located in aligned openings in workpieces to be secured together with said shank having a threaded portion at its outer end, a nut member having a threaded through bore adapted to threadably engage the threads of said threaded portion of said bolt shank, a tubular member being separate from said nut member and having a through bore adapted to receive said bolt shank in a clearance relationship and located between the adjacent one of said workpieces and said nut member and operatively connected with said nut member, said nut member adapted to be threaded onto said threaded portion of said bolt shank and operative against said tubular member with the resultant axial clamp load being applied to the workpieces from said nut member through column loading of said tubular member, said tubular member adapted to collapse at a preselected magnitude of axial load resulting from the torque applied between said nut member and said bolt, said nut member having a radially extending axially inner surface and with said inner surface being spaced from a predetermined confronting surface a preselected axial distance by said tubular member to define a gap, said nut member in response to a second magnitude of axial load on said tubular member moving axially towards said confronting surface upon collapse of said tubular member to substantially close said gap and to thereby provide a verifiable indication of the magnitude of clamp load on said workpieces, said nut member constructed such that closure of said gap occurs substantially independently of any distortion of said nut member.

41. The threaded fastener system of claim 40 with said nut member and said lock base member including connecting means for operatively securing said nut member and said lock base member together prior to installation while permitting said nut member to rotate relative to said lock base member.

* * * * *